A. CHAMPEAU.
COMBINED RAKER GAGE AND JOINTER.
APPLICATION FILED SEPT. 15, 1908.
916,670.  Patented Mar. 30, 1909.
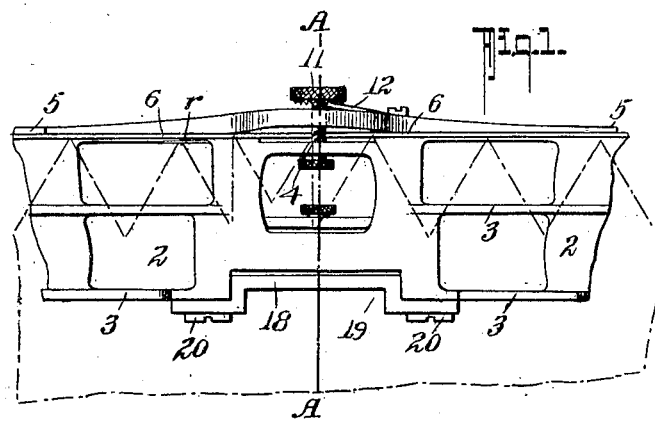
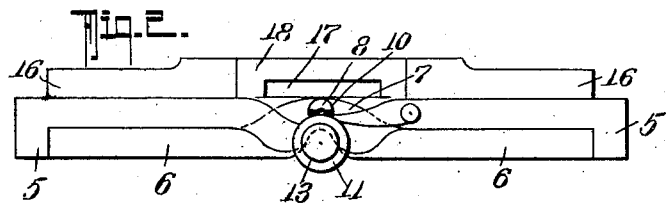
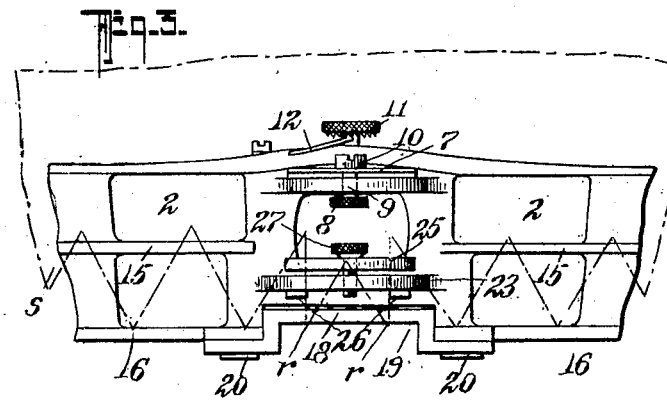
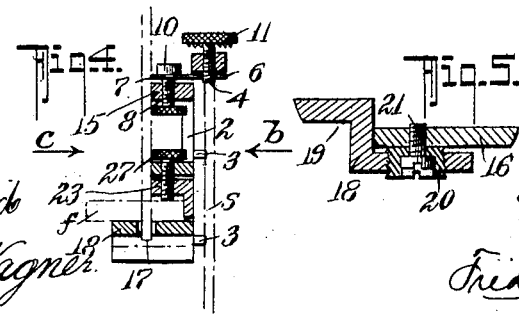
WITNESSES:
H. Woodard
Charles H. Wagner
INVENTOR
Albert Champeau
BY
Fred G. Dieterich
ATTORNEY

UNITED STATES PATENT OFFICE.

ALBERT CHAMPEAU, OF VANCOUVER, BRITISH COLUMBIA, CANADA.

COMBINED RAKER GAGE AND JOINTER.

No. 916,670.   Specification of Letters Patent.   Patented March 30, 1909.

Application filed September 15, 1908. Serial No. 453,128.

*To all whom it may concern:*

Be it known that I, ALBERT CHAMPEAU, citizen of the Dominion of Canada, residing at Vancouver, in the Province of British Columbia, Canada, have invented a new and useful Improvement in a Combined Raker Gage and Jointer, of which the following is a specification.

This invention relates to a combined raker gage and "jointer" such as is used for "jointing" and gaging the raker teeth and "jointing" the tops of the cutting teeth of cross cut saws. These gages as usually furnished are unsatisfactory in the several particulars to which attention is drawn in the following specification which particularly describes my invention, reference being made to the drawings by which it is accompanied, in which:

Figure 1 is an elevation taken in the direction of the arrow *b* in Fig. 4, Fig. 2, a plan, Fig. 3, an elevation taken in the direction of the arrow *c* in Fig. 4, Fig. 4, a cross section on the line A A in Fig. 1, and Fig. 5, a detail to an enlarged scale of the means for attaching and adjusting the "jointing" guard.

In these drawings 2 represents the main body of the tool, 3 being contact projections which bear against the face of the saw blade while applying the raker gage and 4 the adjustable contact by which the depth of the raker teeth below the cutting teeth of the saw is gaged. In all raker gages as at present used this adjustable gage contact 4 is threaded through a right angle projection from the body 2 of the tool forming an extension in a straight line between the end projections 5 of this gage. With such construction, as the cutting edges of the teeth of a cross cut saw form a convex curve from end to end, a straight contact such as at present used will rock on the teeth unless great care is taken to bear evenly on the middle of the gage in applying it. Instead of using a straight contact such as now used I provide a flexible steel strip 6 extending between the bearing points 5 at each end and formed with a backward projection 7 through which an adjusting screw 8 passes, which screw is threaded into a projection 9 toward the back of the gage and provided with a nut 10 between which and a shoulder on the screw the contact strip 6 is secured. By this means the contact strip 6 may be adjusted to any desired curvature corresponding to that of the saw, and the adjustable gage contact 4 around which the strip 6 is carried as at 13 may be adjusted to project any desired distance below the under side of the strip so as to gage the depth of the raker teeth *r* below the cutting teeth as represented by dot and dash lines in Fig. 1.

Instead of as is usual providing a lock nut on the gage contact screw 4 to secure it in any desired position of adjustment, which is an unhandy device, I provide radial serrations on the under side of the milled head 11 of the screw which serrations are engaged by the free end of a light spring 12 secured to the body 2 of the tool. This enables adjustment up or down of the gage point 4 to be readily made while the screw is lightly but firmly retained in the position of adjustment and the upward tendency of the spring 12 takes up any slack of the screw if such there be. On the opposite side of the tool provision is made for filing or "jointing" the tips of the raker teeth for which operation the tool is inverted and the projections 15 are applied to the face of the saw blade and while the tips of the cutting teeth bear against the flanges 16 as indicated by double dot and dash lines in Fig. 3, the raker teeth *r* project through an aperture 17 in a guard 18 secured in a gap toward the middle of the tool between the flanges 16, and while in this position the file may be applied in the recess 19 to file the tips of the raker teeth down to the required level which amount is determined by the distance of the face of the recess 19. As usually made this guard 18 is secured to the body of the tool by two simple screws and any required adjustment is made by the introduction of thin strips of tin in the joint. This is an inconvenient and inaccurate adjustment limited to the thickness of the metal which is available. I provide therefore the attachment of the guard which is illustrated in Fig. 5. This device consists of a screw 20 threaded into each end of the guard 18 and this screw is chambered to receive the head of a screw 21 threaded into the flange 16 by which means the guard 18 may be adjusted in its distance from the under face of 16 by the screws 20 and is secured to the flange 16 and locked in its adjustment thereto by the screw 21.

The tool is also provided with means for topping or "jointing" the ordinary cutting teeth of the saw, for which purpose a flat file *f* is clamped against the under side of the guard 18 and the tool with the file thus secured is applied to the face of the saw with the contacts 15 against the face of the blade and moved over the ordinary cutting teeth until they are reduced to a uniform height or the desired curvature. As ordinarily made the file is secured by a simple screw threaded through a projection 23 which is inefficient in that, in use the file being held by one contact shakes loose. This objection I overcome by providing a clamp member 25 having two contacts 26 which pass through apertures in the projection 23 from the body of the tool. This clamp is secured by a screw 27 threaded into the projection 23 midway between the two clamping contacts 26. The file may be thus securely held against the underside of the guard 18 by the two projections 26 of the clamp.

Although the gage tool is in general construction similar to others at present in use, the several features of improvement are distinctive and suggested from practical experience in the use of such a gage and are designed to facilitate the application of the device to the purpose for which it is designed.

Having now particularly described my invention and the manner of its application, I hereby declare that what I claim as new and desire to be protected in by Letters Patent, is:

1. In a raker gage, the combination with a light frame having contacts to bear against the face of the saw blade and a gage contact screw threaded through a projection over the edge thickness of the blade, of a flexible resilient strip secured over the edge thickness of the blade through which strip the end of the gage contact screw projects, means for adjusting the flexible strip to the curvature of the saw teeth said means comprising a screw threaded through a projection from the frame of the tool and rotatably secured in the flexible strip.

2. In a raker gage of the class described, means for adjustably securing the guard which supports the raker teeth during the operation of the "jointing" said means comprising a screw threaded into each end of the guard which screw is chambered to receive the head of a screw threaded into the body of the tool and by which the guard is attached thereto.

3. In a raker gage of the class described, means for securing the file for "jointing" said means comprising a flange projecting laterally from the body of the gage, a screw threaded through a lateral projection adjacent and a clamping member through which the screw passes which clamp is provided toward each end with downwardly directed contacts which pass through apertures in the projection through which the screw is threaded.

In testimony whereof I have signed my name to this specification in the presence of two subscribing witnesses.

ALBERT CHAMPEAU.

Witnesses:
   ROWLAND BRITTAIN,
   CLIVE S. CARMAN.